United States Patent
Park et al.

(10) Patent No.: US 8,553,600 B2
(45) Date of Patent: Oct. 8, 2013

(54) APPARATUS AND METHOD FOR ESTABLISHING CONTENTION WINDOW IN WIMEDIA WIRELESS NETWORK

(75) Inventors: Joun Sup Park, Gyunggi-do (KR); Chul Gyun Park, Gyunggi-do (KR); Chul Hee Kang, Seoul (KR); Sang Heon Pack, Seoul (KR); Hyun Hee Park, Seoul (KR)

(73) Assignees: Samsung Electro-Mechanics Co., Ltd., Gyunggi-do (KR); Korea University Industrial & Academic Collaboration Foundation, Seoul (KR)

( * ) Notice: Subject to any disclaimer, the term of this patent is extended or adjusted under 35 U.S.C. 154(b) by 242 days.

(21) Appl. No.: 13/092,497

(22) Filed: Apr. 22, 2011

(65) Prior Publication Data
US 2012/0076074 A1  Mar. 29, 2012

(30) Foreign Application Priority Data
Sep. 28, 2010 (KR) .......................... 10-2010-0093883

(51) Int. Cl.
H04B 7/00 (2006.01)
(52) U.S. Cl.
USPC ........................................................ 370/310
(58) Field of Classification Search
USPC ................. 370/310, 312, 328–330, 342, 464, 370/465
See application file for complete search history.

(56) References Cited

U.S. PATENT DOCUMENTS

| | | | |
|---|---|---|---|
| 7,386,014 B2* | 6/2008 | Flemming et al. | 370/503 |
| 7,388,833 B2* | 6/2008 | Yuan et al. | 370/230.1 |
| 7,978,636 B2* | 7/2011 | Gaur | 370/310 |
| 2004/0093421 A1* | 5/2004 | Peng et al. | 709/232 |
| 2005/0064817 A1* | 3/2005 | Ginzburg | 455/41.2 |
| 2005/0185580 A1* | 8/2005 | Conte et al. | 370/229 |
| 2006/0189322 A1* | 8/2006 | Conte et al. | 455/453 |
| 2006/0268716 A1* | 11/2006 | Wijting et al. | 370/235 |
| 2007/0165665 A1* | 7/2007 | Gaur et al. | 370/445 |
| 2009/0196306 A1* | 8/2009 | King et al. | 370/462 |
| 2010/0189024 A1* | 7/2010 | Xhafa et al. | 370/311 |

FOREIGN PATENT DOCUMENTS

KR   1020100045226 A   5/2010

* cited by examiner

*Primary Examiner* — Dmitry H Levitan
(74) *Attorney, Agent, or Firm* — Lowe, Hauptman & Ham

(57) ABSTRACT

There are provided an apparatus and a method for establishing a contention window in a WiMedia wireless network. The contention window establishing apparatus includes: a parsing unit extracting the number of devices that intend to transmit data from a beacon received during a beacon period and an access category (AC) of each device; a calculation unit calculating a transmission probability of each access category (AC) on the basis of the extracted number of devices; and a contention window establishing unit establishing a contention window for each access category (AC) on the basis of the calculated transmission probability, to reduce contentions among the devices and decrease data transmission latency time, thereby maximizing efficiency in data transmission latency time.

8 Claims, 4 Drawing Sheets

APPARATUS AND METHOD FOR ESTABLISHING CONTENTION WINDOW IN WIMEDIA WIRELESS NETWORK

CROSS-REFERENCE TO RELATED APPLICATIONS

This application claims the priority of Korean Patent Application No. 10-2010-0093883 filed on Sep. 28, 2010, in the Korean Intellectual Property Office, the disclosure of which is incorporated herein by reference.

BACKGROUND OF THE INVENTION

1. Field of the Invention

The present invention relates to establishing a contention window, and more particularly, to an apparatus and a method for establishing a contention window in a WiMedia wireless network able to reduce data transmission latency time and maximize data transmission efficiency by establishing an optimal contention window for each access category (AC) on the basis of the number of devices and access categories (AC) acquired from a beacon which has been received during a beacon period (BP), in a prioritized contention access (PCA) method of a WiMedia wireless network.

2. Description of the Related Art

In general, a beacon group is a wireless local network configured to have only WiMedia devices without a coordinator controlling the devices. All of the devices in the network need to transmit beacons during a beacon period (BP) and other devices also need to transmit the beacons. Through these beacons, the WiMedia devices may detect all devices adjacent thereto and be synchronized with the adjacent devices.

Meanwhile, the transmitting and receiving of data between devices in WiMedia network is performed by a distributed reservation protocol (DRP) method and a prioritized contention access (PCA) method.

The DRP method is a non-contention method in which, when a data transmitting device requests a reservation, a data receiving device determines request permission on the basis of its own state and a reservation state within the beacon group.

In contrast, the PCA method is a contention method in which a media acquiring device that transmits data through the contentions of devices during a transmission opportunity (TXOP) period. Since the PCA method is the contention method, the contentions of the devices included in the beacon group rapidly concentrated at a starting point of the PCA period. In this case, in the PCA method according to the related art, a back-off process is performed by random contention windows from the minimum window (CWmin) to the maximum window (CWmax). As a result, a predetermined bandwidth may not be efficiently used.

SUMMARY OF THE INVENTION

An aspect of the present invention provides an apparatus and a method for establishing a contention window capable of maximizing the data transmission efficiency by reducing contentions among devices and decreasing data transmission latency time.

According to an aspect of the present invention, there is provided an apparatus for establishing a contention window in a WiMedia wireless network, the apparatus including: a parsing unit extracting the number of devices that intend to transmit data from a beacon received during a beacon period and an access category (AC) of each device; a calculation unit calculating a transmission probability of each access category (AC) on the basis of the extracted number of devices; and a contention window establishing unit establishing a contention window for each access category (AC) on the basis of the calculated transmission probability.

The access category (AC) may be included in a reserved field of an information element (IE) in the beacon.

The parsing unit may calculate the transmission probability of each access category (AC) by the following equation:

$$P_{BE}=P_{BK}=1/\theta, P_{VT}=\beta/\theta, P_{VO}=\alpha/\theta, \text{where}$$

$P_{BE}$ represents a transmission probability of Best-Effort (BE), $P_{BK}$ represents a transmission probability of Background (BK), $P_{VT}$ represents a transmission probability of Video (VI), $P_{VO}$ represents a transmission probability of Voice (VO), $\theta$ is expressed by $\alpha \times N_{VO}+\beta \times N_{VT}+N_{BE}+N_{BK}$, $N_{VO}$ represents the number of devices that intend to transmit VO, $N_{VT}$ represents the number of devices that intend to transmit VI, $N_{BE}$ represents the number of devices that intend to transmit BE, $N_{BK}$ represents the number of devices that intend to transmit BK, $\alpha$ is 4, and $\beta$ is 2.

Further, the contention window establishing unit may establishe the contention window for each access category (AC) by the following equation: $CW_{VO}=(2\theta/\alpha)-2$, $CW_{VT}=(2\theta/\beta)-2$, $CW_{BE}=CW_{BK}=2\theta-2$, where $CW_{VO}$ represents a contention window value of VO, $CW_{VT}$ represents a contention window value of VI, $CW_{BE}$ represents a contention window value of BE, $CW_{BK}$ represents a contention window value of BK, $\theta$ is expressed by $\alpha \times N_{VO}+\beta \times N_{VT}+N_{BE}+N_{BK}$, $N_{VO}$ represents the number of devices that intend to transmit VO, $N_{VT}$ represents the number of devices that intend to transmit VI, $N_{BE}$ represents the number of devices that intend to transmit BE, $N_{BK}$ represents the number of devices that intend to transmit BK, $\alpha$ is 4, and $\beta$ is 2.

According to another aspect of the present invention, there is provided a method for establishing a contention window in a WiMedia wireless network, the method including: (a) extracting the number of devices that intend to transmit data from beacon received during a beacon period and an access category (AC) of each device; (b) calculating a transmission probability of each access category (AC) on the basis of the extracted number of devices; and (C) establishing a contention window for each access category (AC) on the basis of the calculated transmission probability.

The access category (AC) may be included in a reserved field of an information element (IE) in the beacon.

In step (b), the transmission probability of each access category (AC) may be calculated by the following equation:

$$P_{BE}=P_{BK}=1/\theta, P_{VT}=\beta/\theta, P_{VO}=\alpha/\theta, \text{where}$$

$P_{BE}$ represents a transmission probability of Best-Effort (BE), $P_{BK}$ represents a transmission probability of Background (BK), $P_{VT}$ represents a transmission probability of Video (VI), $P_{VO}$ represents a transmission probability of Voice (VO), $\theta$ is expressed by $\alpha \times N_{VO}+\beta \times N_{VT}+N_{BE}+N_{BK}$, $N_{VO}$ represents the number of devices that intend to transmit VO, $N_{VT}$ represents the number of devices that intend to transmit VI, $N_{BE}$ represents the number of devices that intend to transmit BE, $N_{BK}$ represents the number of devices that intend to transmit BK, $\alpha$ is 4, and $\beta$ is 2.

In step (c), the contention window is established for each access category (AC) by the following equation:

$$CW_{VO}=(2\theta/\alpha)-2, CW_{VT}=(2\theta/\beta)-2, CW_{BE}=CW_{BK}=2\theta-2,$$

where $CW_{VO}$ represents a contention window value of VO, $CW_{VT}$ represents a contention window value of VI, $CW_{BE}$ represents a contention window value of BE, $CW_{BK}$ represents a contention window value of BK, θ is expressed by $α×N_{VO}+β×N_{VI}+N_{BE}+N_{BK}$, $N_{VO}$ represents the number of devices that intend to transmit VO, $N_{VI}$ represents the number of devices that intend to transmit VI, $N_{BE}$ represents the number of devices that intend to transmit BE, $N_{BK}$ represents the number of devices that intend to transmit BK, α is 4, and β is 2.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
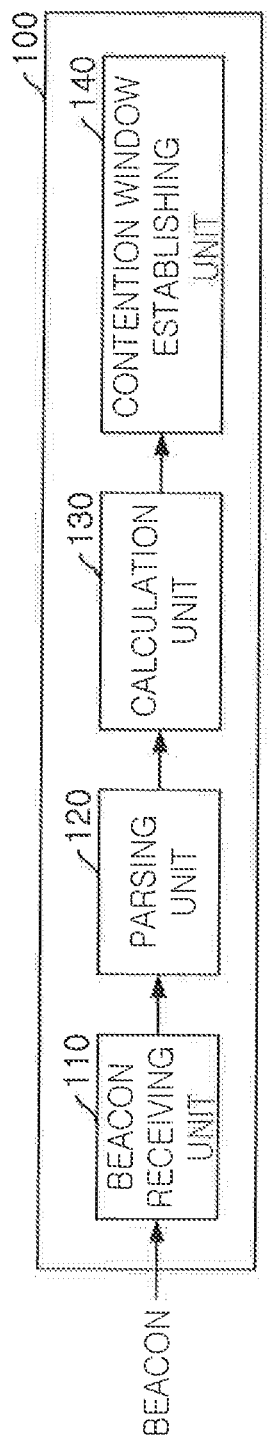
FIG. 1 is a configuration diagram of an apparatus for establishing a contention window according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Like reference numerals refer to like elements in the accompanying drawings.

Figure 2:
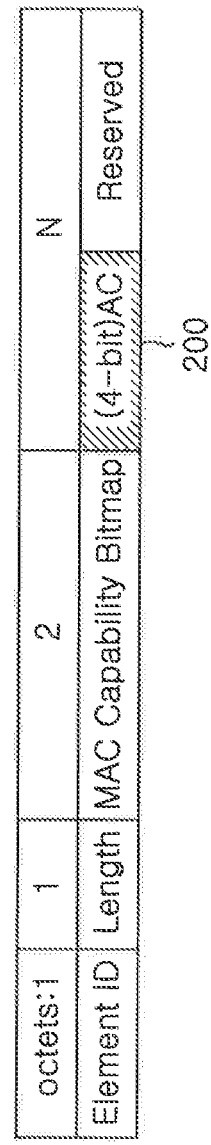
FIG. 2 is a diagram showing an IE including an access category (AC) according to an exemplary embodiment of the present invention.
Figure 3:
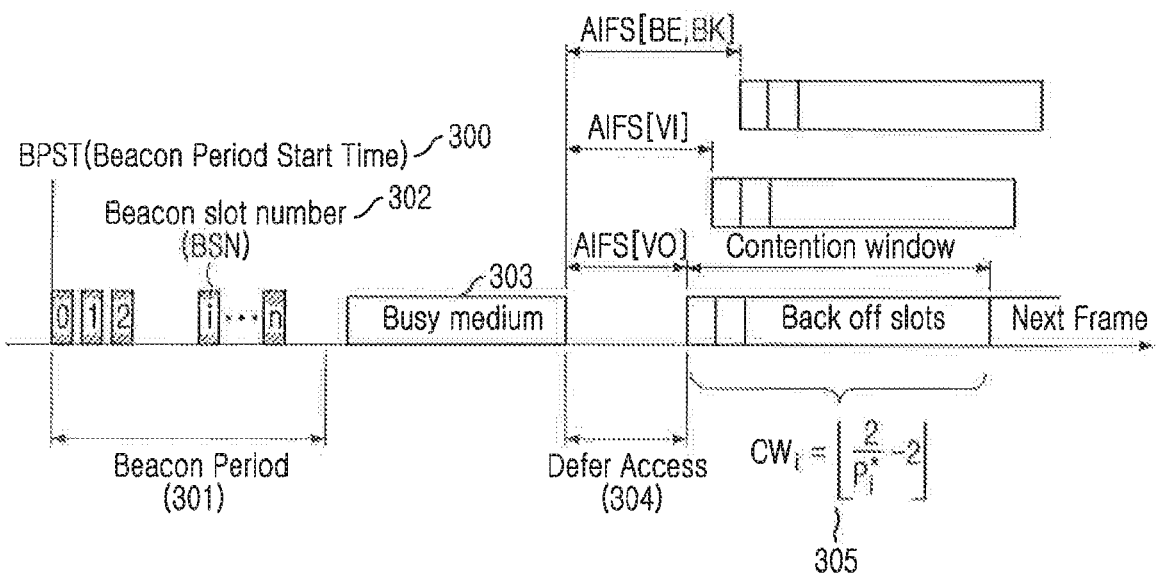
FIG. 3 is a conceptual diagram of a method for establishing a contention window according to an exemplary embodiment of the present invention.
Figure 4:
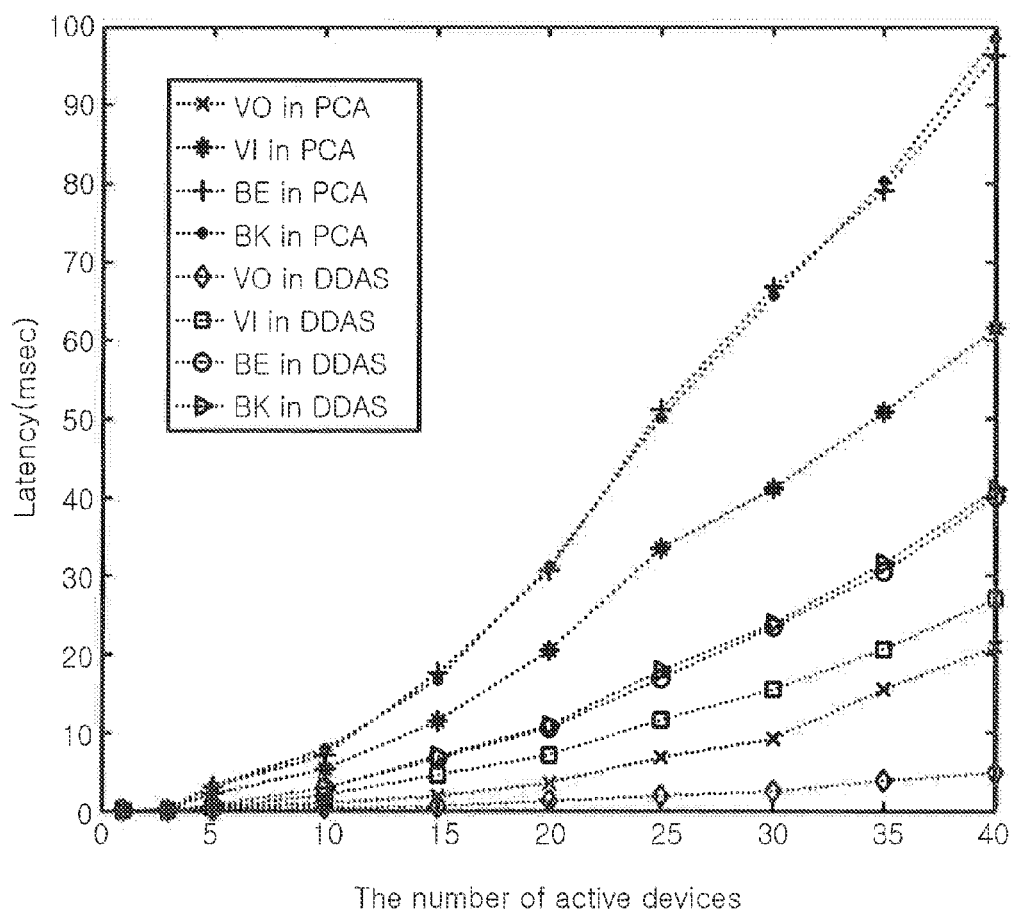
FIG. 4 is a graph comparing the performance of a network when establishing a contention window by a general PCA method with the performance of a network when establishing a contention window according to the present invention.

FIG. 1 is a configuration diagram of an apparatus 100 for establishing a contention window according to an exemplary embodiment of the present invention and may include a beacon receiving unit 110, a parsing unit 120, a calculation unit 130, and a contention window establishing unit 140. Meanwhile, FIG. 2 is a diagram showing an information element (IE) including an access category (AC) according to an exemplary embodiment of the present invention. In addition, FIG. 3 is a conceptual diagram of a method for establishing a contention window according to an exemplary embodiment of the present invention. FIG. 4 is a graph comparing the performance of a network when establishing a contention window by a general PCA method and the performance of a network when establishing a contention window according to the present invention. Hereinafter, the present invention will be referred to as a distributed and dynamic adaptation scheme (DDAS).

Referring to FIG. 1, the beacon receiving unit 110 receives beacons from other devices that exist in a WiMedia network and transmits the received beacons to the parsing unit 120.

The parsing unit 120 analyzes the beacons transmitted from the beacon receiving unit 110 and thereafter, extracts the number of devices and the access category (AC) of the corresponding device. The number of devices and the access category (AC) of the corresponding device that are extracted are transmitted to the calculation unit 130. The access category (AC) may include Best-Effort (BE), Background (BK), Video (VI), and Voice (VO).

In general, for WiMedia communication to occur, all devices existing in a network should transmit beacons for a beacon period and other devices should receive the beacons. Numbers from 0 are sequentially granted to beacon slots included in the beacons. The devices scan the beacons and select a beacon slot, other than one of the beacon slots occupied by adjacent devices, and transmit the selected beacon slot by including its own communication mechanism in the information element (IE). Each device finds adjacent devices on the basis of the received IE and is synchronized with the adjacent devices. The used IE, as an IE having MAC capabilities, is transmitted while being included in the beacon for the general WiMedia communication. According to the present invention, the IE included in the beacon may include the access category (AC). That is, a reserved field of the IE including the access category (AC) is transmitted so as to use the existing resource efficiently.

The IE will be described in detail with reference to FIG. 2.

Referring to FIG. 2, the IE includes an element ID and a length, a MAC capability bitmap, and the like and in addition, has a reserved field to be used afterwards. According to the present invention, 4 bits of the reserved field are allocated as a region 200 for the access category (AC) and this region including the access category (AC) may be transmitted to other devices.

Referring back to FIG. 1, the calculation unit 130 calculates a transmission probability of the access category (AC) on the basis of the number of devices and the access category (AC) of the corresponding device that are received from the parsing unit 120. The calculated transmission probability of the access category (AC) is transmitted to the contention window establishing unit 140.

In detail, the calculation unit 130 calculates the transmission probability of each access category (AC) by Equation 1.

$$P_{BE}=P_{BK}=1/θ, P_{VI}=β/θ, P_{VO}=α/θ \quad \text{[Equation 1]}$$

Herein, θ is $α×N_{VO}+β×N_{VI}+N_{BE}+N_{BK}$, $N_{VO}$ is the number of devices of which the access category (AC) is VO, $N_{VI}$ is the number of devices of which the category (AC) is VI, $N_{BE}$ is the number of devices of which the category (AC) is BE, $N_{BK}$ is the number of devices of which the category (AC) is BK, α may be 4, and β may be 2.

Hereinafter, a process of deriving Equation 1 will be described.

The access category (AC) applied to the PAC method of the WiMedia MAC may be divided into Voice (VO), Video (VI), Best-Effort (BE), and Background (BK). When the transmission probabilities of the access categories are $P_{VO}$, $P_{VI}$, $P_{BE}$, $P_{BK}$, a relationship of $P_{VO}>P_{VI}>P_{BE}=P_{BK}$ may be established according to the priority among the access categories (AC). The reason is that a contention window having a small value can be expressed as a high transmission probability because the transmission probability is influenced by a value of a contention window. Accordingly, a relationship between $P_{VO}$ and $P_{VI}$ may be established as shown in Equation 2 on the basis of $P_{BE}$ which is a low priority.

$$P_{VO}=α×P_{BE}, P_{VI}=β×P_{BE} \quad \text{[Equation 2]}$$

Herein, α and β are constants determined by the contention window using the PCA method and a condition of α>β and β>0.1 should be satisfied. Further, α=4 and β=2 are determined by considering the relationship among contention window values (i.e., Cwmin[VO]=4, Cwmax[VO]=256, Cwmin

[VI]=8, Cwmax[VI]=512, Cwmin[BE, BK]=16, and Cwmax [BE, BK]=1023) defined in the existing PCA method.

Next, Equation 3 may be considered in order to acquire an optimum transmission probability.

$$N_{VO} \times P_{VO} + N_{VT} \times P_{VT} + N_{BE} \times P_{BE} + N_{BK} \times P_{BK} = 1 \quad \text{[Equation 3]}$$

Herein, $N_{VO}$, $N_{VT}$, $N_{BE}$, and $N_{BK}$ are the numbers of devices of which the access categories are VO, VI, BE, and BK.

Equation 4 may be acquired from Equation 2 and Equation 3.

$$(\alpha \times N_{VO} + \beta \times N_{VT} + N_{BE} + N_{BK}) \times P_{BE} = 1 \quad \text{[Equation 4]}$$

Thereafter, by considering Equation 2 while assuming that $\alpha \times N_{VO} + \beta \times N_{VT} + N_{BE} + N_{BK}$ is $\theta$, Equation 1 may be acquired and the transmission probability of each access category (AC) may be calculated by Equation 1.

Meanwhile, the contention window establishing unit 140 establishes the contention window for each access category on the basis of the transmission probability of each access category (AC) transmitted from the calculation unit 130.

In detail, the contention window establishing unit 140 may establish the contention window by Equation 5.

$$CWi = \left\lfloor \frac{2}{Pi} - 2 \right\rfloor \quad \text{[Equation 5]}$$

Herein, CW represents the contention window value, Pi represents the transmission probability for each access category acquired from Equation 1, and i may be BE, BK, VI, and VO.

Last, when the contention window value is expressed for each access category (AC) from Equation 5 and Equation 1, the contention window value may be expressed as shown in Equation 6.

$$CW_{VO} = (2\theta/\alpha) - 2, CW_{VT} = (2\theta/\beta) - 2,$$
$$CW_{BE} = CW_{BK} = 2\theta - 2 \quad \text{[Equation 6]}$$

Herein, $CW_{VO}$ represents a contention window value of VO, $CW_{VT}$ represents a contention window value of VI, $CW_{BE}$ represents a contention window value of BE, $CW_{BK}$ represents a contention window value of BK, $\theta$ is expressed by $\alpha \times N_{VO} + \beta \times N_{VT} + N_{BE} + N_{BK}$, $N_{VO}$ represents the number of devices transmitting VO, $N_{VT}$ represents the number of devices transmitting VI, $N_{BE}$ represents the number of devices transmitting BE, $N_{BK}$ represents the number of devices transmitting BK, $\alpha$ may be 4, and $\beta$ may be 2.

FIG. 3 is a diagram for describing the contention window establishing method according to the exemplary embodiment of the present invention.

As shown in FIG. 3, for the WiMedia communication to occur, all devices that exist in the network transmit the beacons during a beacon period 301 from a beacon period start time 300 and other devices should receive the beacons. Beacon slot numbers (BSN) 302 from 0 are sequentially granted to beacon slots included in the beacon, and each of the devices scans the beacon and selects a beacon slot, other than one of those beacon slots occupied by adjacent devices, and transmits the selected beacon slot by including its own communication mechanism in the information element (IE). Thereafter, when it is detected that a busy medium 303 is terminated, a standby time AIFS[VO], AIFS[VI], or AIFS[BE, BK] as long as a predetermined time for each access category elapses according to a defer access 304 and thereafter, a backoff process is performed according to a value set in the contention window. Herein, in the backoff process, a terminal that defers data transmission until media are not being used does not start transmitting data just when AIFS is ended, but starts transmitting the data after it waits for a predetermined time according to the value set in the contention window.

According to the present invention, as shown in reference numeral 305 (and Equation 5), since the optimum contention window is established for each access category on the basis of the transmission probability considering the number of devices, contentions among the devices may be reduced and data transmission latency time may be decreased so as to maximize efficiency in data transmission as compared with the existing PCA method for establishing random contention windows from Cwmin to Cwmax.

FIG. 4 is a graph comparing the performance of a network in establishing a contention window by a general PCA method with the performance of a network in establishing a contention window according to the present invention and in FIG. 4, a horizontal axis represents the number of devices and a vertical axis represents transmission latency.

As shown in FIG. 4, assuming that devices of the same number exist in the WiMedia network, transmission latency, by the DDAS method of the present invention, may be remarkably decreased in respects to each of the access categories (VO, VI, BE, and BK) as compared with the existing PCA method.

Figure 5:
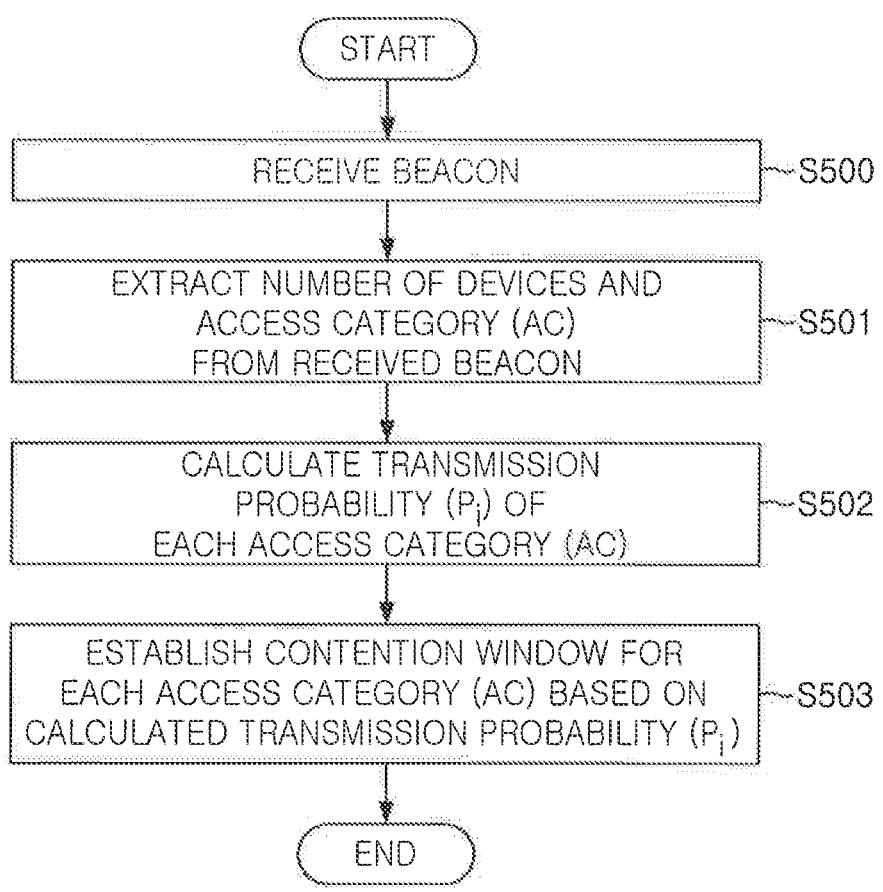
FIG. 5 is a flowchart describing a method for establishing a contention window according to an exemplary embodiment of the present invention.

FIG. 5 is a flowchart describing a method for establishing a contention window according to an exemplary embodiment of the present invention. For simplicity of the present invention, a duplicated description with the matters described above with reference to FIGS. 1 to 4 will be omitted.

In step S500, a beacon receiving unit 110 receives beacons from other devices that exist in a WiMedia network and transmits the received beacons to a parsing unit 120.

In step S501, the parsing unit 120 analyzes the beacons transmitted from the beacon receiving unit 110 and thereafter, extracts the number of devices and an access category (AC) of the corresponding device. The number of devices and the access category (AC) of the corresponding device that are extracted are transmitted to a calculation unit 130. The access category (AC) may include Best-Effort (BE), Background (BK), Video (VI), and Voice (VO).

In step S502, the calculation unit 130 calculates a transmission probability of the access category (AC) on the basis of the number of devices and the access category (AC) of the corresponding device that are received from the parsing unit 120. The calculated transmission probability of the access category (AC) is transmitted to a contention window establishing unit 140.

Last, in step S503, the contention window establishing unit 140 establishes the contention window for each access category on the basis of the transmission probability of each access category (AC) transmitted from the calculation unit 130. Thereafter, a backoff process is performed according to the established contention window.

As set forth above, it is possible to maximize the efficiency of data transmission by reducing contentions among devices and decreasing data transmission latency time by establishing an optimal contention window for each access category (AC) on the basis of the number of devices and an access category (AC) acquired from a beacon received during a beacon period (BP).

While the present invention has been shown and described in connection with the exemplary embodiments, it will be apparent to those skilled in the art that modifications and variations can be made without departing from the spirit and scope of the invention as defined by the appended claims. Accordingly, the scope of the present invention will be determined by the appended claims.

What is claimed is:

1. An apparatus for establishing a contention window in a WiMedia wireless network, the apparatus comprising:
   a parsing unit configured to extract the number of devices that intend to transmit data from a beacon received during a beacon period and an access category (AC) of each of the devices;
   a calculation unit configured to calculate a transmission probability of each access category (AC) on the basis of the extracted number of devices; and
   a contention window establishing unit configured to establish a contention window for each access category (AC) on the basis of the calculated transmission probability, wherein
   the access category (AC) comprises at least one of Best-Effort (BE), BacKground (BK), VIdeo (VI) and VOice (VO), and
   the calculation unit is configured to provide a weight of each access category (AC) to the devices and calculate the transmission probability of each access category using the weight.

2. The apparatus of claim 1, wherein the access category (AC) is included in a reserved field of an information element (IE) in the beacon.

3. The apparatus of claim 1, wherein the calculation unit is configured to calculate the transmission probability of each access category (AC) by the following equations:

$$P_{BE}=P_{BK}=1/\theta, P_{VI}=\beta/\theta, P_{VO}=\alpha/\theta, \text{where}$$

$P_{BE}$ represents a transmission probability of Best-Effort (BE), $P_{BK}$ represents a transmission probability of Background (BK), $P_{VI}$ represents a transmission probability of Video (VI), $P_{VO}$ represents a transmission probability of Voice (VO), $\theta$ is expressed by $\alpha \times N_{VO}+\beta \times N_{VI}+N_{BE}+N_{BK}$, $N_{VO}$ represents the number of devices that intend to transmit VO, $N_{VI}$ represents the number of devices that intend to transmit VI, $N_{BE}$ represents the number of devices that intend to transmit BE, $N_{BK}$ represents the number of devices that intend to transmit BK, $\alpha$ is 4, and $\beta$ is 2.

4. The apparatus of claim 1, wherein the contention window establishing unit is configured to establish the contention window for each access category (AC) by the following equations:

$$CW_{VO}=(2\theta/\alpha)-2, CW_{VI}=(2\theta/\beta)-2, CW_{BE}=CW_{BK}=2\theta-2, \text{where}$$

$CW_{VO}$ represents a contention window value of VO, $CW_{VI}$ represents a contention window value of VI, $CW_{BE}$ represents a contention window value of BE, $CW_{BK}$ represents a contention window value of BK, $\theta$ is expressed by $\alpha \times N_{VO}+\beta \times N_{VI}+N_{BE}+N_{BK}$, $N_{VO}$ represents the number of devices that intend to transmit VO, $N_{VI}$ represents the number of devices that intend to transmit VI, $N_{BE}$ represents the number of devices that intend to transmit BE, $N_{BK}$ represents the number of devices that intend to transmit BK, $\alpha$ is 4, and $\beta$ is 2.

5. A method of establishing a contention window in a WiMedia wireless network, the method comprising the steps of:
   (a) extracting the number of devices that intend to transmit data from a beacon received during a beacon period and an access category (AC) of each of the devices;
   (b) calculating a transmission probability of each access category (AC) on the basis of the extracted number of devices; and
   (c) establishing a contention window for each access category (AC) on the basis of the calculated transmission probability, wherein
   the access category (AC) comprises at least one of Best-Effort (BE), BacKground (BK), VIdeo (VI) and VOice (VO), and
   step (b) comprises:
   (b-1) providing a weight of each access category (AC) to the devices; and
   (b-2) calculating the transmission probability of each access category using the weight.

6. The method of claim 5, wherein the access category (AC) is included in a reserved field of an information element (IE) in the beacon.

7. The method of claim 5, wherein in step (b), the transmission probability of each access category (AC) is calculated by the following equations:

$$P_{BE}=P_{BK}=1/\theta, P_{VI}=\beta/\theta, P_{VO}=\alpha/\theta, \text{where}$$

$P_{BE}$ represents a transmission probability of Best-Effort (BE), $P_{BK}$ represents a transmission probability of Background (BK), $P_{VI}$ represents a transmission probability of Video (VI), $P_{VO}$ represents a transmission probability of Voice (VO), $\theta$ is expressed by $\alpha \times N_{VO}+\beta \times N_{VI}+N_{BE}+N_{BK}$, $N_{VO}$ represents the number of devices that intend to transmit VO, $N_{VI}$ represents the number of devices that intend to transmit VI, $N_{BE}$ represents the number of devices that intend to transmit BE, $N_{BK}$ represents the number of devices that intend to transmit BK, $\alpha$ is 4, and $\beta$ is 2.

8. The method of claim 5, wherein in step (c), the contention window is established for each access category (AC) by the following equations:

$$CW_{VO}=(2\theta/\alpha)-2, CW_{VI}=(2\theta/\beta)-2, CW_{BE}=CW_{BK}=2\theta-2, \text{where}$$

$CW_{VO}$ represents a contention window value of VO, $CW_{VI}$ represents a contention window value of VI, $CW_{BE}$ represents a contention window value of BE, $CW_{BK}$ represents a contention window value of BK, $\theta$ is expressed by $\alpha \times N_{VO}+\beta \times N_{VI}+N_{BE}+N_{BK}$, $N_{VO}$ represents the number of devices that intend to transmit VO, $N_{VI}$ represents the number of devices that intend to transmit VI, $N_{BE}$ represents the number of devices that intend to transmit BE, $N_{BK}$ represents the number of devices that intend to transmit BK, $\alpha$ is 4, and $\beta$ is 2.

* * * * *